United States Patent
Kiiashko et al.

(10) Patent No.: US 12,545,622 B2
(45) Date of Patent: Feb. 10, 2026

(54) METHOD FOR MANUFACTURING A CONCRETE FORMULATED ON THE BASIS OF ACTIVATED SLAG

(71) Applicants: VINCI CONSTRUCTION, Rueil-Malmaison (FR); VINCI CONSTRUCTION FRANCE, Nanterre (FR); ECOCEM MATERIALS LIMITED, Dublin (IE)

(72) Inventors: Artur Kiiashko, L'Hay les Roses (FR); Laurent Frouin, L'Hay les Roses (FR); Paul-Alexandre Franco, Corbeil-Essonnes (FR); François Cussigh, Mezy sur Seine (FR)

(73) Assignees: VINCI CONSTRUCTION, Rueil-Malmaison (FR); VINCI CONSTRUCTION FRANCE, Nanterre (FR); ECOCEM MATERIALS LIMITED, Dublin (IE)

( * ) Notice: Subject to any disclaimer, the term of this patent is extended or adjusted under 35 U.S.C. 154(b) by 408 days.

(21) Appl. No.: 18/011,046

(22) PCT Filed: Jul. 19, 2021

(86) PCT No.: PCT/EP2021/070171
§ 371 (c)(1),
(2) Date: Dec. 16, 2022

(87) PCT Pub. No.: WO2022/018037
PCT Pub. Date: Jan. 27, 2022

(65) Prior Publication Data
US 2023/0242447 A1  Aug. 3, 2023

(30) Foreign Application Priority Data
Jul. 20, 2020  (FR) ...................................... 2007575

(51) Int. Cl.
C04B 28/08   (2006.01)
C04B 7/153   (2006.01)
C04B 24/00   (2006.01)
C04B 103/00  (2006.01)
C04B 103/10  (2006.01)
C04B 111/00  (2006.01)

(52) U.S. Cl.
CPC .......... *C04B 28/082* (2013.01); *C04B 7/1535* (2013.01); *C04B 24/003* (2013.01); *C04B 2103/0086* (2013.01); *C04B 2103/10* (2013.01); *C04B 2111/00017* (2013.01)

(58) Field of Classification Search
CPC ... C04B 28/082; C04B 7/1535; C04B 24/003; C04B 2103/0086; C04B 2103/10; C04B 2111/00017; C04B 28/08; Y02P 40/10; Y02W 30/91
See application file for complete search history.

(56) References Cited

FOREIGN PATENT DOCUMENTS

| CN | 101100854 A | * | 1/2008 | ........... C04B 14/062 |
|---|---|---|---|---|
| WO | 2019/110134 A1 | | 6/2019 | |
| WO | 2019/110280 A1 | | 6/2019 | |

OTHER PUBLICATIONS

Translation of Written Opinion for PCT/EP2021/070171 (Year: 2023).*
International Search Report and Written Opinion for counterpart Application No. PCT/EP2021/070171, dated Oct. 28, 2021.
Database WPI Week 200833, Thomson Scientific, London, GB; AN 2008-E72818, XP002802357, & CN 101 100 854 A (Yang Y), dated Jan. 9, 2008.
Ramirez et al., "Study of the effect of Triethanolamine as a chelating agent in the simultaneous electrodeposition of copper and zinc from non-cyanide electrolytes," Journal of Electroanalytical Chemistry, vol. 765, Jun. 3, 2015, pp. 132-139.

* cited by examiner

*Primary Examiner* — Anthony J Green
(74) *Attorney, Agent, or Firm* — The Marbury Law Group, PLLC (57) ABSTRACT

Method for manufacturing a concrete from activated slag, comprising at least the steps consisting of: a) arranging a premixture P of water and granulates, the temperature of the premixture P being at least equal to 10° C., b) arranging an activation system A comprising at least a co-binder, a chelating agent, an alkali metal carbonate and a carbonated material different from the alkali metal carbonate, c) incorporating the activation system A and a slag S by mixing them into the premixture P, the activation system A and slag S being introduced successively and/or simultaneously, d) continuing the mixing until a fresh concrete is obtained, and e) allowing the fresh concrete to cure.

21 Claims, 2 Drawing Sheets

METHOD FOR MANUFACTURING A CONCRETE FORMULATED ON THE BASIS OF ACTIVATED SLAG

CROSS REFERENCE TO RELATED APPLICATIONS

This is a National Stage Application of PCT/EP2021/070171, filed internationally on Jul. 19, 2021, which claims priority to French Application No. 2007575, filed on Jul. 20, 2020, which are both incorporated by reference herein in their entireties.

TECHNICAL FIELD

The present invention relates to a low-carbon concrete, in particular to a low-carbon structural concrete, formulated on the basis of slag, in particular of activated slag. The invention also relates to a process for the manufacture of such a concrete.

PRIOR ART

The use of cement concretes, conventionally considered as structural concretes, presents a concern in terms of environmental impact. In view of their composition, namely a mixture of aggregates and sand agglomerated by a cement-based binder, generally Portland cement, these concretes contribute significantly to $CO_2$ emissions, mainly due to the manufacture of clinker, an essential constituent of Portland cement.

In order to reduce the environmental impact of concretes, it has been proposed to replace, generally partially, the clinker by other compounds. Thus, different classes of cement, comprising lower clinker contents than those of Portland cement, have been developed. However, for excessively low clinker contents, the strength of the concrete is insufficient for the concrete to be employed as structural concrete.

Another alternative solution for reducing the environmental impact of concrete is the replacement of a cement-based binder by an activated slag-based binder. A slag is regarded as having a very low carbon footprint, as it is generally a byproduct of the metallurgical industry, in particular generated during the manufacture of cast iron. An activated slag is a slag to which at least one activator is added, making it possible to accelerate the reaction of the slag with water. WO 2019/110134 and WO 2019/110280 very particularly provide a binder formulation based on activated slag comprising at least one slag, at least one activator and at least one chelating agent and/or one chelating agent source, and also a wet composition comprising the binder, water and at least one aggregate. However, until now, it has been very difficult to employ an activated slag concrete on a construction site, in particular to form a structuring element, because the performance qualities achieved by such a concrete are insufficient compared to a cement concrete.

In particular, these concretes do not reproduce the properties of conventional concretes, in terms of:
  fluidity over a sufficient period of time to transport the concrete and to place it;
  short-term mechanical strength (of the order of a day), in particular in order to make it possible to rapidly dismantle the formwork and not to slow down the construction sites;
  long-term mechanical strength (of the order of 28 days), in order to be able to use the concrete as structural concrete;
  robustness, in particular with respect to variations in water content, and also to the conditions of the construction site, such as the temperature;
  shrinkage, which must be limited in order to maintain the dimensions of the molded element during the reaction and drying.

There thus remains a need for an activated slag concrete possessing improved performance qualities in these respects.

The invention is targeted specifically at providing an activated slag concrete giving satisfaction in these terms.

Against all expectations, the inventors have found that these objectives can be achieved in particular via the adjustment of a specific process for the preparation of an activated slag concrete.

DISCLOSURE OF THE INVENTION

Thus, the present invention relates, according to a first aspect, to a process for the manufacture of an activated slag concrete, comprising at least the stages consisting in:
  a) having available a premix P of water and of aggregates, the temperature of said premix P being at least equal to 10° C., preferably 15° C.,
  b) having available an activation system A comprising at least one cobinder, a chelating agent, an alkali metal carbonate and a carbonate material distinct from said alkali metal carbonate,
  c) incorporating, under mixing, in said premix P, said activation system A and a slag S, said activation system A and said slag S being introduced successively and/or simultaneously,
  d) prolonging said mixing until a fresh concrete is obtained, and
  e) leaving said fresh concrete to harden.

According to a first alternative form, stage c) employs said activation system A in the form of a premix P' with a slag S. Such a premix P' can still be described as binder within the meaning of the invention.

According to a second alternative form, stage c) comprises the incorporation of the slag S following that of the activation system A.

According to a third alternative form, stage c) comprises the incorporation of the activation system A following that of the slag S.

The first and second alternative forms are preferred.

According to a specific embodiment, the process additionally comprises the incorporation of at least one adjuvant chosen in particular from plasticizers, superplasticizers and their mixtures, in particular in stage c) or d).

As emerges from the examples below, such a process makes it possible to significantly improve the performance qualities of an activated slag concrete compared to an ordinary process for the manufacture of concrete on a construction site.

Advantageously, stages c) to d), indeed even a) to d), of the process can be carried out in a concrete mixing plant, preferably a concrete mixing plant with a forced-action mixer. This type of mixer has blades which rotate around a vertical or horizontal axis, or two horizontal axes, and create high shearing of the material favoring the quality and the speed of the mixing.

Whereas, for concretes manufactured from conventional cements, the order of introduction of the various constituents has no major impact on the properties of the mixture, the inventors have discovered that the introduction of the activation system A into a premix P makes it possible, against all expectations, to significantly increase the workability time of an activated slag concrete.

As illustrated in the examples which follow, such a process makes it possible in particular to form and maintain a fresh concrete having a high fluidity, in particular a concrete of consistency class S4 according to the standard NF EN 206/CN, for a period of time of at least 2 hours, i.e. at least approximately three times longer than with a conventional process. In addition, the presence of the cobinder required according to the invention advantageously makes it possible to limit the shrinkage of the concrete, to improve its early-age strength, and to obtain better robustness of the formulation, in particular with respect to variations in the ambient temperature, in the nature and in the source of the aggregates and in their humidity, as well as variations in the water/slag S ratio, indeed even in the water/(slag S+activation system A) ratio.

Finally, the employment of the premix P at a temperature at least equal to 10° C., preferably 15° C., makes it possible to improve the robustness of the process with respect to variations in the ambient temperature.

According to another of its aspects, the present invention relates to an activated slag concrete obtained by the process according to the invention.

A concrete in accordance with the invention has, in addition to the advantage of being a low-carbon, indeed even very-low-carbon, concrete, the great advantage of being able to be used as structural concrete.

According to yet another of its aspects, the invention relates to a fresh activated slag concrete obtained on conclusion of stage d) of the process according to the invention.

This fresh concrete makes it possible in particular to have enough time to place it on the construction site before it sets.

According to yet another of its aspects, the invention relates to a reinforced activated slag concrete comprising steel reinforcements and an activated slag concrete according to the invention.

The invention also relates to a structuring element comprising an activated slag concrete according to the invention.

Finally, it relates to a precast element comprising an activated slag concrete according to the invention.

The term "fresh concrete" is understood to mean a concrete in the phase which follows the mixing and precedes the setting, that is to say a concrete which has the ability to deform and/or to flow.

The adjective "dry" characterizes a material devoid of mixing water.

In the continuation of the text, the ratios by weight are expressed as dry matter.

Furthermore, the term "binder" refers, in the continuation of the text, to the combination of the activation system A with the slag S. Thus, the weight of the binder is the total weight of the activation system A and of the slag S.

DETAILED DESCRIPTION

Process for the Manufacture of an Activated Slag Concrete

As emerges from the foregoing, the process of the invention requires that a premix P, an activation system A and a slag S be brought together.

Premix P

Stage a) of the process consists in having available a premix P of water and of aggregates, the temperature of which is at least equal to 10° C., preferably at least equal to 15° C.

The term "aggregate" refers to a broad category of particulate materials used in construction. The aggregates can be chosen from fillers, sand, fine sand, gravel, fine gravel, crushed rock, scoria, crushed or recycled concrete, geosynthetic aggregates, expanded shale, expanded clay and their mixtures.

In particular, the fillers can be chosen from fly ash, silica fume, pozzolans, calcined shale and their mixtures. Crushed rock can be formed from siliceous, calcareous and/or silico-calcareous rocks.

Preferably, the aggregates are chosen from the materials in accordance with Article 10 of the standard NF P 18-545.

Preferably, the aggregates have a size of less than 32 mm.

Most often, the aggregates employed on a construction site are in wet form considering that they are most often handled in an outdoor atmosphere. The process of the invention advantageously makes it possible to also consider wet aggregates of this type, which by nature are less easy to handle than dry aggregates for the manufacture of the activated slag concrete.

These aggregates are generally considered at a proportion by weight varying from 65% to 80%, with respect to the total weight of the fresh concrete.

Furthermore, the premix P is prepared with water brought to a temperature appropriate for adjusting the temperature of said premix P to a value at least equal to 10° C., preferably at least equal to 15° C. This premix P temperature makes it possible, via a dissolution of the reactive entities at play in the first hours of the fresh concrete, to significantly stimulate the reaction of the slag S with the water as soon as it is incorporated in the premix P.

In fact, the control of the temperature of the premix P is above all determining when the ambient temperature is less than 10° C. This is because the inventors have observed that a temperature of less than 10° C. slows down, indeed even prevents, the setting and/or the rise in strength of the concrete.

Consequently, the water employed to form the premix P is preferably at a temperature varying from 10° C. to 85° C.

According to a preferred embodiment, the premix P is at a temperature at least equal to 15° C. in stage a), indeed even at a temperature varying from 15° C. to 25° C.

Activation system A

This activation system A comprises at least one cobinder, a chelating agent, an alkali metal carbonate and a carbonate material distinct from the alkali metal carbonate, Preferably, the activation system A is in the form of a dry mixture and in particular of a powder.

a) Cobinder

The cobinder can be an aerial or hydraulic binder, preferably a hydraulic binder suitable for use according to the standard NF EN 206/CN. For example, the cobinder can be lime, clinker or Portland cement.

Preferably, the cobinder is a precursor of calcium ions. In particular, the cobinder is capable of releasing calcium ions when it is brought into contact with water.

The cobinder is advantageously characterized by a Blaine fineness (ASTM C 204) (Bf), expressed in $cm^2/g$ and in increasing order of preference:

$500 \leq Bf \leq 10000$;

$1000 \leq Bf \leq 9000$;

$2000 \leq Bf \leq 8000$.

The content of cobinder employed in the process is advantageously low, in particular less than 20% and preferably less than 10% by weight, with respect to the weight of the binder. According to a preferred embodiment, the process employs the cobinder at a content of less than 5% by weight, in particular varying from 1% to 5% by weight, with respect to the total weight of said activation system A and said slag S. In an alternative form, the process preferably employs the cobinder and the slag S in a cobinder/slag S ratio by weight varying from 1% to 5%.

Advantageously, the presence of cobinder in the activation system A makes it possible to reduce the shrinkage of the concrete during the setting and the drying. In addition, the cobinder makes it possible to accelerate the rise in strength of the concrete and to reach a class of strength at least equal to C30/37 at 28 days according to the standard NF EN 206/CN. Finally, the cobinder contributes to the robustness of the process with respect to the starting materials, the water/binder ratio and the temperature.

b) Chelating Agent

Within the meaning of the invention, the term "chelating agent" covers any compound endowed with the ability to chelate or to form such a compound. Preferably, the chelating agent is a compound endowed with this ability.

Advantageously, this or these chelating agent(s) is a chelating agent for the calcium ion or for the aluminum ion, and preferably for the calcium ion.

The chelating agent can be chosen from:
phosphonates, preferably monophosphonates and/or diphosphonates;
phosphates, preferably tripolyphosphates and/or hexametaphosphates;
carboxylates, preferably polyacrylates, citrates, tartrates and/or gluconates;
amines;
their derivatives, their salts;
and their mixtures;
preferably chosen from PBTC (phosphonobutane-1,2,4-tricarboxylic acid), ATMP (aminotri(methylenephosphonic acid)), HEDP (1-hydroxyethylidene-1,1-diphosphonic acid), DTPA (diethylenetriaminepentaacetic acid), DCTA (diaminocyclohexanetetraacetic acid), PAA (polyacrylic acid), PPA (phosphino-polyacrylate), PMA (polymaleic acid), MAT (maleic acid terpolymer), SPOCA (sulfonated phosphonocarboxylic acid), PPCA (polyphosphonocarboxylic acid), EDTMP (ethylenediaminetetra(methylenephosphonic acid)) and DTPMP (diethylenetriaminepenta(methylenephosphonic acid)), their derivatives, their salts and their mixtures.

In particular, the chelating agent can be chosen from phosphonates, preferably monophosphonates and/or diphosphonates, and more preferentially from HEDP (1-hydroxyethylidene-1,1-diphosphonic acid) and EDTMP (ethylenediaminetetra(methylenephosphonic acid)).

More particularly, the chelating agent can be chosen from the chelating agents provided in the documents WO 2019/110134 and WO 2019/110280 of Ecocem. Among these chelating agents, the following compound proves to be very particularly advantageous:

[Chem 1]

Furthermore, the process can employ the chelating agent and the slag S in a ratio by weight of the chelating agent with respect to the slag S varying from 0.001% to 2%, preferably from 0.01% to 1% and more preferentially from 0.1% to 0.7%.

In an alternative form, the process can also employ the chelating agent and the binder in a ratio by weight of the chelating agent with respect to the binder varying from 0.001% to 2%, preferably from 0.01% to 1%.

c) Alkali Metal Carbonate

The activation system A also comprises at least one alkali metal carbonate.

The alkali metal carbonate is employed as activator of the water/slag reaction, also called activator in the continuation of the text. The alkali metal carbonate thus makes it possible to accelerate the water/slag reaction.

The alkali metal carbonate promotes the setting and/or the curing and/or the hardening of the slag S.

The alkali metal carbonate can be in hydrated or anhydrous solid form, for example in the form of a powder, or else in a liquid form, for example in solution or suspension. Preferably the alkali metal carbonate is in the form of a powder.

In particular, the activation system A comprises at least one alkali metal carbonate chosen from sodium carbonates, potassium carbonates, lithium carbonates and their mixtures.

Preferably, the activation system A comprises at least one alkali metal carbonate chosen from sodium carbonates, potassium carbonates and their mixture, and more preferentially comprises at least sodium carbonate.

The process according to the invention can employ the alkali metal carbonate and the slag S in an alkali metal carbonate/slag S ratio by weight varying from 2% to 12%, preferably from 6% to 10%.

In an alternative form, the process can employ the alkali metal carbonate and the binder in an alkali metal carbonate/binder ratio by weight varying from 2% to 11%, preferably from 5% to 9%.

Furthermore, the concentration of the alkali metal carbonate, preferably of sodium carbonate, in the water can vary from 100 g/l to 300 g/l, preferably from 150 g/l to 250 g/l.

d) Carbonate Material Distinct from Said Alkali Metal Carbonate

The activation system A additionally comprises at least one carbonate material distinct from the alkali metal carbonate, also called carbonate material in the continuation of the description. In particular, the activation system A comprises at least one alkaline earth metal carbonate.

Preferably, the carbonate material comprises at least calcium carbonate. In particular, the carbonate material distinct from the alkali metal carbonate is provided in the form of at least one material chosen from limestone, dolomite, precipitated calcium carbonate, chalk, marble, aragonite, travertine, tufa and their mixtures, and preferably comprises at least, indeed even consists of, limestone.

Preferably, the carbonate material is employed in the form of a coproduct(s) of various industries, or in its natural or synthetic form.

The carbonate material can be a crystalline solid or an ionic solid.

According to an advantageous form of the invention, the carbonate material is a powder, the median size D50 of which can be chosen from the following categories:

a'1) D50 is within the interval [250 μm-40 mm], for example [5-15 mm];

a'2) D50 is within the interval [16.0-250.0 µm], for example [90-110 µm];

a'3) D50 is within the interval [6.0-16.0 µm], for example [9-11 µm];

a'4) D50 is within the interval [3.0-6.0 µm], for example [3.5-5.5 µm];

a'5) D50 is within the interval [0.9-3.0 µm], preferably [1.0-2.0 µm], for example [1.4-1.6 µm];

a'6) D50 is within the interval [0.02-0.9 µm], for example [0.49-0.51 µm];

a'7) and their mixtures.

An example of carbonate material of class a'6) is precipitated calcium carbonate (PCC).

The carbonate material, preferably in powder form, can comprise (as percentage by dry weight, with respect to the carbonate material):

αα1) 100% of carbonate material of class a'1), or

αα2) 100% of carbonate material of class a'3), or

αα3) between 90% and 10%, preferably between 80% and 30%, of carbonate material of class a'1), and between 10% and 90%, preferably between 20% and 70%, of carbonate material of class a'2), or αα4) between 1% and 40%, preferably between 10% and 30%, of carbonate material of class a'3), or αα5) between 1% and 20%, preferably between 5% and 15%, of carbonate material of class a'3), and between 99% and 80%, preferably between 95% and 85%, of carbonate material of class a'5).

Furthermore, the specific surface of the carbonate material, obtained by the BET method, can range from 1 to 60 $m^2/g$, for example from 20 to 30 $m^2/g$ and/or from 3 to 13 $m^2/g$.

Furthermore, the process employs the carbonate material and the slag S in a carbonate material/slag S ratio by weight which can vary from 1% to 50%, preferably from 3% to 35% and more preferentially from 5% to 15%. In an alternative form, the process employs the carbonate material and the binder in a carbonate material/binder ratio by weight which can vary from 1% to 35%, preferably from 3% to 25% and more preferentially from 5% to 20%.

According to one embodiment, the activation system A can additionally comprise at least one coactivator, other than the alkali metal carbonate.

e) Coactivator

The coactivator can be chosen from the group comprising lime, soluble chloride and/or fluoride and/or sulfate salts, their hydrates, their anhydrous forms and their mixtures. Preferably, the coactivator can be chosen from the group comprising at least lime, NaCl, $CaCl_2$, NaF, $Na_2SiF_6$, KCl, $Na_2SO_4$, $K_2SO_4$, $CaSO_4$, their hydrates, their anhydrous forms and their mixtures.

In particular, the process can employ the coactivator and the slag S in a coactivator/slag S ratio by weight varying from 0.001% to 30%, preferably from 0.01% to 16% and more preferentially from 0.05% to 10%.

In an alternative form, the process can employ the coactivator and the binder in a coactivator/binder ratio by weight varying from 0.001% to 20%, preferably from 0.01% to 14% and more preferentially from 0.05% to 9%.

In stage b) of the process of the invention, the activation system A as defined above can be employed as such or in the form of a premix P' with a slag S. The use of a premix which can also be described as binder, is particularly advantageous in the case of the preparation of concrete directly on a construction site because it makes possible better control of the proportions of the mixture. Furthermore, the process on a construction site is in this case facilitated and accelerated.

Slag S

The slag S can be employed in the form of the premix P' as described above, or in individualized form in the powder state.

Conventionally, the slag is employed in the form of a coproduct(s) of various industries, or in its natural or synthetic form. In general, the slag is a powder or a slurry.

Preferably, the slag S comprises at least one ground granulated blast-furnace slag (GGBS). In particular, the slag S can be a GGBS.

A GGBS is a granular material generally obtained by rapid cooling with water of the molten slag originating from the smelting of iron ore in a blast furnace, followed by grinding to improve the reactivity of the GGBS. GGBS is an amorphous aluminosilicate glass, essentially composed of $SiO_2$, CaO, MgO and $Al_2O_3$.

GGBS is preferably manufactured according to the European standard NF EN 15167-1. The chemical composition of the slag S can be as follows, as percentage by dry weight, with respect to the slag S:

TABLE 1

| CaO | $SiO_2$ | $Al_2O_3$ | $Fe_2O_3$ | $TiO_2$ | MgO | $SO_3$ | $Na_2O$ | $K_2O$ |
|---|---|---|---|---|---|---|---|---|
| [30.0-50.0] | [30.0-50.0] | [5.0-18.0] | [0.1-1.5] | [0.1-3.0] | [1.0-15.0] | [0.5-3.0] | [0.01-2.0] | [0.01-1.0] |

According to a preferred form of the invention, the slag S is a powder, the median size D50 of which can be chosen from the following categories:

a1) D50 is within the interval [7.0-20.0 µm], [7.0-60 µm] or [7.0-100.0 µm] (for example, a standard GGBS);

a2) D50 is within the interval [3.0-7.0 µm] (for example, a fine GGBS);

a3) D50 is within the interval [0.5-3.0 µm], preferably [1.0-2.0 µm] or [0.5-2.0 µm] (for example, an ultrafine GGBS); and a4) their mixtures.

The term "median size" of a set of particles, denoted D50, refers to the size dividing the particles of this set into first and second populations equal in weight, these first and second populations comprising only particles exhibiting a size greater, or respectively less, than the median size.

In another embodiment, the slag S powder comprises (as percentage by dry weight, with respect to the slag S):

α1) 100% of slag powder of class a1), or

α2) between 99% and 50%, preferably between 99% and 60%, of slag powder of class a1), and between 1% and 50%, preferably between 1% and 40%, of slag powder of class a2), or α3) between 1% and 40%, preferably between 1% and 30%, of slag powder of class a3).

The slag S can also have a Blaine fineness (Bf) (standard ASTM C 204), expressed in $cm^2/g$, such as, in increasing order of preference:

$500 \leq Bf \leq 20000$;

$1000 \leq Bf \leq 10000$;

$2000 \leq Bf \leq 8000$;

$3000 \leq Bf \leq 7000$;

$3500 \leq Bf \leq 6000$.

According to an alternative form of the invention, the slag S comprises from 70% to 99.1% by weight, preferably from 80% to 99.1% by weight, with respect to the weight of the slag S, of particles such that $2500 \leq Bf \leq 8000$, preferably $3500 \leq Bf \leq 7000$, and from 30% to 0.1% by weight, preferably from 20% to 0.1% by weight, with respect to the weight of the slag S, of particles such that $8000 \leq Bf \leq 16\,000$, preferably $10\,000 \leq Bf \leq 14\,000$. As a side note, GGBS is a hydraulic binder and the slag alone can then react with water.

Preferably, the process employs the slag S in a slag S/binder ratio by weight which can vary from 30% to 95%, preferably from 50% to 92% and more preferentially from 60% to 90%.

According to a particularly preferred embodiment, the activation system A is in the form of a premix P' with a slag S, the premix P' comprising at least:
 a GGBS,
 a cobinder, preferably chosen from hydraulic binders,
 a chelating agent chosen from HEDP, EDTMP and their mixture,
 limestone,
 sodium carbonate, in particular with a sodium carbonate/GGBS ratio of 6% to 10%.

In the case where the activation system A is in the form of a premix P', the latter can additionally comprise at least one filler, for example fly ash, silica fume, pozzolans, calcined shale or their mixtures.

The cobinder(s), chelating agent(s), carbonate material(s) distinct from the alkali metal carbonate, alkali metal carbonate(s), coactivator(s), slag(s) and filler(s) can comprise other characteristics, such as described in the applications WO 2019/110134 and WO 2019/110280.

The process according to the invention considers, in its stage c), incorporation, under mixing, in said premix P, of said activation system A and of a slag S, said activation system A and said slag S being introduced successively and/or simultaneously.

According to a first embodiment, the activation system A and the slag S are introduced successively into the premix P. For example, the activation system A can be incorporated before or after the slag S in the premix P. Preferably, the activation system A is incorporated before the slag S in the premix P. This first embodiment is particularly advantageous in the case where bulk slag is already available in one of the silos of the concrete mixing plant and/or if the aggregates exhibit a particularly high moisture content (typically of greater than 6%).

According to another embodiment, the activation system A of stage b) is in the form of a premix P' with said slag S, and said activation system A and said slag S are incorporated simultaneously in the premix P. This process can in particular be advantageous in the case of the manufacture of precast concrete or in the case of an on-site concrete mixing plant, which are less demanding in terms of duration of transportation of the concrete.

Advantageously, the process according to the invention is devoid of any stage of dry mixing of the activation system A with said aggregates.

The slag S is incorporated in the premix P so that the water/binder ratio is suitable for the manufacture of the concrete, in particular for the reaction of the slag S with water, for the rise in strength of the concrete and for the required fluidity of the fresh concrete.

In particular, the process employs water, the activation system A and the slag S in a water/(activation system A+slag S) ratio varying from 0.1 to 1, preferably from 0.2 to 0.55 and more preferentially from 0.3 to 0.5. The weighing devices and the system for controlling the water content of the aggregates must make it possible to regulate the water content of the concrete with an accuracy of 10 liters/m$^3$.

Furthermore, the mixing is preferably carried out in a mixer. Preferably, the mixing in stage(s) c) and/or d) can be carried out with a forced-action mixer.

Stage d)

Stage d) consists in prolonging said mixing until a fresh concrete is obtained, in particular in a forced-action mixer.

Advantageously, the fresh concrete exhibits an Abrams cone slump (standard NF EN 12350-2) of greater than or equal to 160 mm, preferably varying from 160 mm to 210 mm. In particular, the fresh concrete obtained in stage d) is characterized by a slump of greater than or equal to 160 mm The concrete obtained by the process advantageously falls within the consistency class S4 or S5, preferably S4, according to the standard NF EN 206/CN.

Such a fresh concrete has a fluidity making it possible in particular to manufacture piles, diaphragm walls, footings, stringers, slabs, floors, posts, beams and/or shells.

Preferably, the fresh concrete retains a slump of greater than or equal to 160 mm over a period of time long enough to be able to place it.

In particular, the fresh concrete displays a slump of greater than or equal to 160 mm for a period of time of at least 60 min, indeed even of at least 90 min, preferably of at least 120 min.

The process can additionally comprise a placing stage d1) between the mixing stage d) and the hardening stage e).

In particular, the fresh concrete can be placed in a formwork element, especially in a form panel, and then preferably compacted using internal or external vibration. For example, the fresh concrete can be placed in a formwork element comprising at least one reinforcement, in particular a reinforcement cage.

Stage e)

Stage e) consists in leaving said fresh concrete to harden.

In general, the slag S, the activation system A and the water which are present in the fresh concrete react, making it possible for the concrete to set. The strength of the concrete subsequently increases over time.

Stage e) can take place at ambient temperature and ambient humidity, for example outdoors on a construction site or else in a precasting factory.

The temperature can be controlled in stage e). For example, the concrete can be subjected to a temperature varying from 15 to 80° C., preferably from 20 to 65° C. and more preferentially from 25 to 50° C., in particular for 1 to 48 h, indeed even for 5 to 36 h.

It is also possible for stage e) to comprise cycles increasing and decreasing in temperatures, at a relative humidity of greater than or equal to 40%, preferably of greater than or equal to 80%, and more preferentially equal to 100%, under a pressure varying from 8 to 12 atm, or a pressure of 1 atm.

The process can additionally comprise a drying stage f) following stage e).

As stated above, the process according to the invention can additionally comprise the use of at least one adjuvant in stage c) and/or in stage d), in particular chosen from plasticizers, superplasticizers and their mixtures, and especially from superplasticizers.

Adjuvant(s)

The adjuvant(s) can be incorporated in the premix P in the form of a premix with the activation system A. If appropriate, they can also be incorporated in the form of a premix with the premix P'. In an alternative form, the adjuvant(s) can be incorporated in the premix P after the activation system A, indeed even after the activation system A and after the slag S.

The adjuvant(s) can be incorporated in a solid form, in particular in the form of a powder, or in a liquid form.

The process can employ, as adjuvant, at least one superplasticizer or plasticizer chosen from NBSP (naphthalene-based superplasticizers), PNS (polynaphthalene sulfonates), MBSP (melamine-based superplasticizers), PMS (polymelamine sulfonates), HCA (hydroxycarboxylic acids), (P)AA (poly(acrylic acid)), LS (lignosulfonates), in particular ammonium, calcium or sodium lignosulfonates, PCE (polycarboxylic ethers), PCA (polycarboxylic acids), phosphonates, their salts and/or their derivatives and their mixtures. In particular, the process can employ, as adjuvant, at least one superplasticizer or plasticizer chosen from NBSP (naphthalene-based superplasticizers), PNS (polynaphthalene sulfonates), LS (lignosulfonates) and their mixtures, preferably chosen from PNS, LS and their mixtures.

In an alternative form, the superplasticizer can be chosen from MBSP, PMS, NBSP, PNS, PCE and their mixtures.

Furthermore, the process can employ the superplasticizer(s) or plasticizer(s) in a ratio by weight of the superplasticizer(s) or plasticizer(s), with respect to the slag S, varying from 0.05% to 2%, preferably from 0.1% to 1% and more preferentially from 0.2% to 0.5%. In an alternative form, the process can employ the superplasticizer(s) or plasticizer(s) in a ratio by weight of the superplasticizer(s) or plasticizer(s), with respect to the binder, varying from 0.05% to 2%, preferably from 0.1% to 1%, more preferentially from 0.2% to 0.5%.

The process can also employ, as adjuvant, at least one compound chosen from water retainers, thickeners, antifoaming agents, biocides, pigments, flame retardants, air entrainers, retarders, accelerators, fibers, dispersion powders, wetting agents, polymer resins, complexing agents other than the chelating agent, polymer dispersions, shrinkage-reducing agents and their mixtures.

The adjuvant(s), in particular of superplasticizer type, can comprise other characteristics or other compounds as described in the applications WO 2019/110134 and WO 2019/110280.

Activated Slag Concrete

The invention also relates to an activated slag concrete obtained by the process as described above.

In particular, this concrete is endowed with a 1-day compressive strength of at least 1 MPa, in particular 5 MPa, indeed even 15 MPa, according to standard NF EN 12390-3, as a function of the curing temperature varying in particular from 15° C. to 80° C. The activated slag concrete can advantageously have the formwork dismantled 1 day after stage c).

In particular, the activated slag concrete falls at least within the strength class C30/37, preferably falls within the strength class C30/37, according to the standard NF EN 206/CN. Such a concrete is characterized by a characteristic 28-day compressive strength on a cylindrical specimen of at least 30 MPa and on a cubic test specimen of at least 37 MPa. The activated slag concrete has in particular a 28-day compressive strength sufficient to form piles, diaphragm walls, footings, stringers, slabs, floors, posts, beams and/or shells.

In particular, the activated slag concrete falls within the consistency class S4 or S5, preferably within the consistency class S4, according to the standard NF EN 206/CN, for a period of time of at least 60 min, in particular of at least 90 min and more particularly of at least 120 min.

This characteristic contributes a satisfactory workability to the fresh activated slag concrete.

Fresh Activated Slag Concrete

The invention also relates to a fresh activated slag concrete obtained on conclusion of stage d) of the process described above.

Such a fresh concrete has a fluidity making it possible for it to be poured before it loses in fluidity.

Structuring Element and Precast Element

The invention also relates to a reinforced activated slag concrete, comprising steel reinforcements and an activated slag concrete as described above.

In particular, the steel reinforcements can be of varied forms, and in particular in the form of wires, round bars, rods or welded wire meshes.

Furthermore, the invention relates to a structuring element comprising an activated slag concrete as described above, the structuring element preferably being a pile, a diaphragm wall, a footing, a stringer, a slab, a floor, a post, a beam or a shell.

In particular, the structuring element can be manufactured directly on a construction site or in a precasting factory. For example, the structuring element can comprise a reinforced activated slag concrete as described above.

According to a preferred embodiment, the structuring element is manufactured directly on a construction site.

The invention also relates to a precast element comprising an activated slag concrete as described above.

In particular, the precast element can be manufactured according to the process described above, in particular in a precasting factory or on a construction site. The precast element can, for example, be obtained by on-site precasting. For example, the precast element can comprise a reinforced activated slag concrete as described above.

EXAMPLES

Materials and Methods

The following starting materials were used:

Semi-crushed silico-calcareous aggregates with a density of 2530 kg/m$^3$ and a water absorption of 1.3%;

Slag originating from the Ecocem factory at Fos-sur-Mer, produced according to the European standard (NF EN 15167-1). The particle size distribution is characterized by D10=1.38 μm; D50=12.16 μm and D90=34.87 μm. The particle size distribution values are determined with a laser diffraction particle sizer from Malvern named "Mastersizer 3000", according to the liquid dispersion method. The Blaine fineness is 4500 cm²/g;

Cobinder: it is a clinker, the Blaine fineness of which is 3100 cm²/g and the main chemical components of which are as follows: CaO (67% by weight), $SiO_2$ (21% by weight), $Fe_2O_3$ (5% by weight), $SO_3$ (3% by weight);

Anhydrous sodium carbonate ($Na_2CO_3$), 99% purity, sold by Solvay;

Calcium carbonate, with a median diameter D50=1 μm and with a BET specific surface of 80 000 cm²/g;

Chelating agent HEDP·4Na;

Superplasticizer of PNS type (solids content 32%).

The Abrams cone slump measurements are carried out on concrete (FIG. 1) according to the standard NF EN 12350-2 at a temperature of 20° C. and the Abrams minicone spreading measurements are carried out on mortar (FIG. 2) according to the provisions of the standard NF EN 12350-8 using the CEM minicone (Abrams cone at ½ scale) instead of the Abrams cone.

The shrinkage is measured on test specimens with dimensions of 7×7×28 cm³ stored at 20° C. and 50% relative humidity according to the standard NF P 15-433.

The compressive strength is measured for the concretes on test specimens with a diameter of 110 mm and a height of 200 mm according to the standard NF EN 12390-3. For the mortars, the compressive strength is measured on 4 cm×4 cm×16 cm prisms according to the standard NF EN 196-1.

Example 1

Preparation of a Concrete According to the Invention (Method 1)

An activation system is prepared by dry mixing sodium carbonate, calcium carbonate, chelating agent and cobinder in the proportions indicated in table 2 as percentage by weight.

The concrete is prepared by incorporation, under mixing, of the following constituents in the mixer, in the proportions described in detail in table 2, according to the following sequence:

Aggregates;

Water at a temperature making it possible to obtain an equilibrium temperature with the aggregates of between 15° C. and 25° C.;

Mixing for 30 seconds;

Activation system;

Mixing for 30 seconds;

Slag;

Mixing for 30 seconds;

Superplasticizer;

Final mixing for 3 minutes.

TABLE 2

|  | Composition A (according to the invention) | Competition B (outside the invention) | Composition C (according to the invention) |
|---|---|---|---|
| Slag (kg/m³) | 400 | 400 | 400 |
| Activation system (kg/m³) | (sodium carbonate 51% + calcium carbonate 25.5% + chelating agent 3.1% + cobinder 20.4%) 78.4 kg/m³ | (sodium carbonate 61.8% + calcium carbonate 37.5% + chelating agent 0.7%): 53.4 kg/m³ | (sodium carbonate 51.5% + calcium carbonate 25.8% + cobinder 20.6% + chelating agent 2.1%): 77.6 kg/m³ |
| Aggregates (kg/m³) | 1642 | 1642 | 1642 |
| Effective water (kg/m³) | 177 | 172 | 172 |
| Superplasticizer with a solids content of 32% (kg/m³) | 5 | 5.7 | 5 |

Example 2

Preparation of a Concrete According to the Invention (Method 2)

The activation system is prepared as in example 1.

A premix of the activation system and of the slag is prepared by dry mixing.

The concrete is prepared by incorporation, under mixing, of the following constituents in the mixer, in the proportions described in detail in table 2, according to the following sequence:

Aggregates;

Water at a temperature making it possible to obtain an equilibrium temperature with the aggregates of between 15° C. and 25° C.;

Mixing for 30 seconds;

Premixing of the activation system and of the slag;

Mixing for 30 seconds;

Superplasticizer;

Final mixing for 3 minutes.

Example 3

Preparation of a Concrete Outside the Invention (Method 3)

The activation system is prepared as in example 1.

A premix of the activation system and of the slag is prepared as in example 2.

The concrete is prepared by incorporation, under mixing, of the following constituents (which are at ambient temperature of the laboratory, i.e. 20° C.) in the mixer, in the proportions described in detail in table 2, according to the following sequence:

Aggregates;

Premixing of the activation system and of the slag;

Dry mixing for 30 seconds;

Water;

Mixing for 30 seconds;

Superplasticizer;

Final mixing for 3 minutes.

Example 4

Abrams Cone Slump Test

Abrams cone slump tests are carried out for methods 1, 2 and 3, described in detail respectively in examples 1, 2 and 3, with composition A of table 2.

Figure 1:
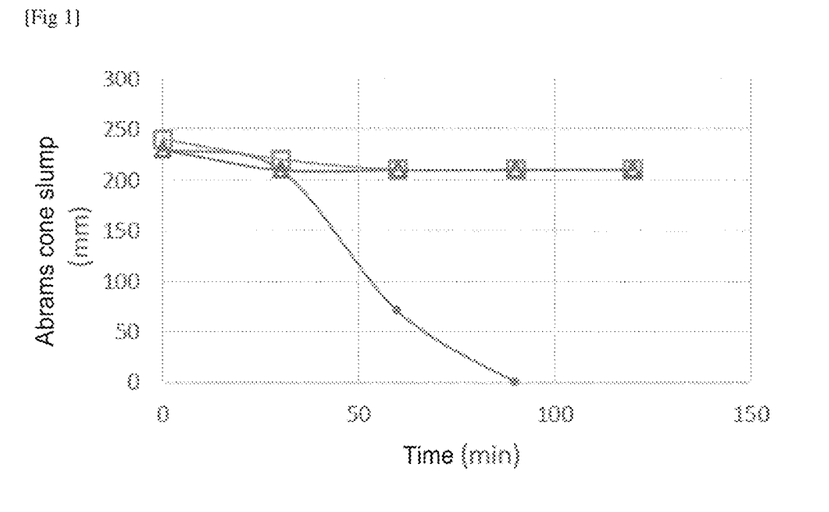
FIG. 1 represents the Abrams cone slump results of an activated slag concrete obtained by the process of the invention according to example 1 (□ symbols) or 2 (Δ symbols) or obtained by a method outside the invention according to example 3 (⊚ symbols).

The results, represented in FIG. 1, show that methods 1 and 2 according to the invention make it possible to maintain a fluid concrete consistency, characterized by a slump of greater than 160 mm, for more than 2 hours. On the contrary, in the case of method 3 outside the invention, the concrete lost its fluid concrete consistency after 45 minutes.

Abrams minicone spreading tests are also carried out according to method 2, described in detail in example 2, with the concrete equivalent mortar proportions corresponding to composition A (see table 3 below) for a premix of aggregates and of water at different temperatures.

TABLE 3

| Constituent | Slag | Activation system (sodium carbonate 51% + calcium carbonate 25.5% + chelating agent 3.1% + cobinder 20.4%) | Aggregates | Effective water | Superplasticizer |
|---|---|---|---|---|---|
| Proportion (g) | 1184 | 232 | 2597 | 338 | 15 |

The following three tests are carried out:
i) The water and the aggregates are conditioned at 20° C. before they are mixed, and the premix P obtained has a temperature of 20° C.;
ii) The aggregates are conditioned at 5° C. and are mixed with water at 60° C., forming a premix P having a temperature of 27° C.;
iii) The water and the aggregates are conditioned at 5° C. before they are mixed, and the premix P obtained has a temperature of 5° C.

Figure 2:
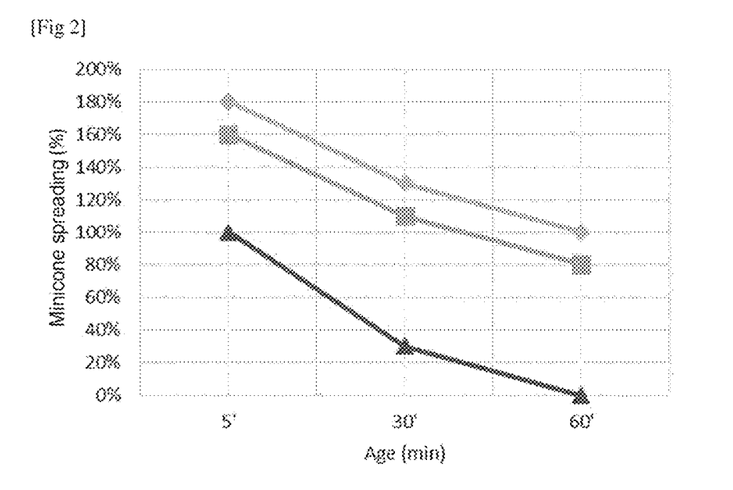
FIG. 2 represents the results of spreading with the Abrams minicone (expressed as percentage) of an activated slag mortar obtained by the process of the invention according to the form of introduction of example 2 with water and aggregates at 20° C. (◇ symbols), water at 60° C. and aggregates at 5° C. (□ symbols) and water and aggregates at 5° C. (Δ symbols).

FIG. 2 represents the results of the minicone spreading obtained. In the two cases where the premix of water and of aggregates obtained has a temperature of greater than 15° C. (case i) and ii) above), the consistency of the mortar is kept fluid for at least 1 hour. On the contrary, the use of materials which do not respect the recommendations of temperatures, as in the case of the premix of water and of aggregates at 5° C. (case iii) above), causes a rapid stiffening of the mortar and does not make it possible to obtain the maintenance of a fluid consistency.

Example 5

Results of the Shrinkage

The measurements of the shrinkage are carried out for three test specimens obtained with composition A.

Figure 3:
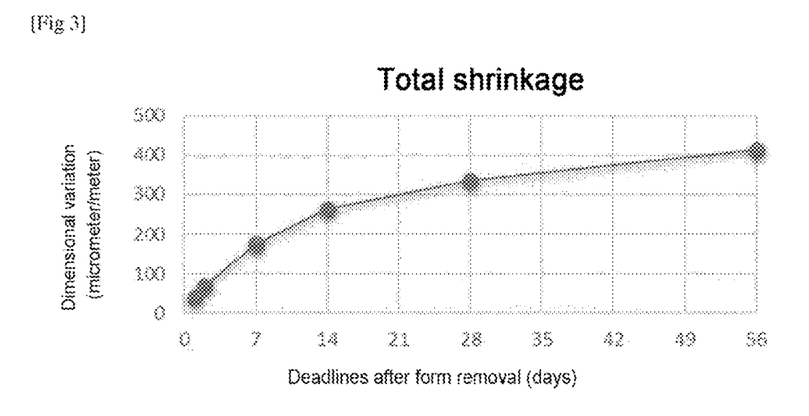
FIG. 3 represents the mean shrinkage measured on 3 test specimens of one and the same activated slag concrete obtained by the process according to the invention.

The curve of FIG. 3 corresponds to the mean of the deformations measured on each of the three prisms of one and the same concrete. It shows that the shrinkage of a concrete according to the invention is comparable to the shrinkage of a conventional cement concrete.

Example 6

Robustness of Concrete Composition in Accordance and not in Accordance with the Invention Strength measurements are carried out for concretes prepared with composition B (outside the invention) and composition C (according to the invention).

In addition, concretes, the composition of which comprises:
an excess of water of 10 liters (composition B or C with 182 kg/m³ of water per 400 kg/m³ of slag), or
a deficiency in water of 10 liters (composition B or C with 162 kg/m³ of water per 400 kg/m³ of slag),
are produced in order to evaluate the robustness of the composition.

Figure 4:
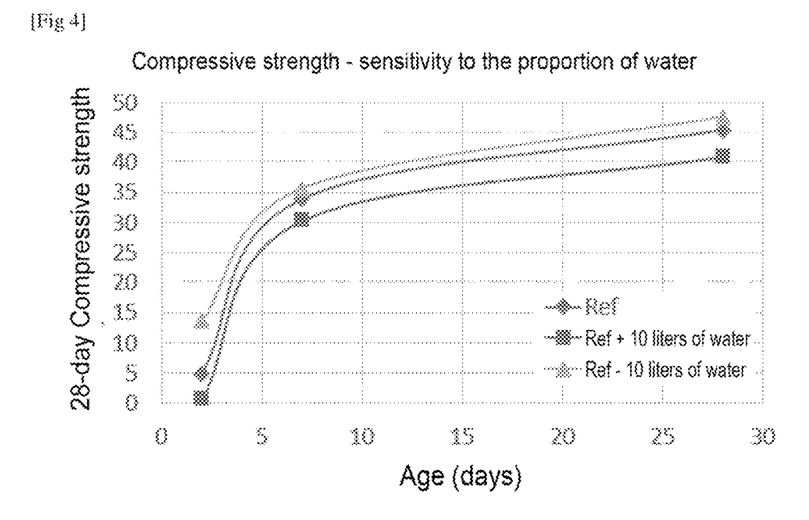
FIG. 4 represents the compressive strength of an activated slag concrete obtained by a process according to the invention with a water/binder ratio of 0.34 (Δ symbols), 0.36 (◇ symbols) and 0.38 (□ symbols).

The results for composition C according to the invention are given in FIG. 4. The impact of the amount of water in the mixture virtually does not modify the mechanical strength of the test specimens obtained. In addition, a compressive strength of greater than 40 MPa is measured at 28 days.

On the contrary, the results for composition B outside the invention, given in table 4, show that the concrete experiences an extreme slowdown in its hardening in the case of an excess of water. CS represents the compressive strength measured at different ages of the concrete.

TABLE 4

| Batch | CS48h (MPa) | CS72h (MPa) | CS7d (MPa) | CS28d (MPa) |
|---|---|---|---|---|
| Composition B (20° C.) | 0.8 | 1.0 | 28.8 | 48.2 |
| Composition B + 10 liters (20° C.) | 0 | 0 | 0 | n.m. |

The invention claimed is:

1. A method for the manufacture of an activated slag concrete comprising:
   a) having at least one premix P comprising water and at least one aggregate, wherein the temperature of the at least one premix P is at least 10° C.,
   b) having at least one activation system A comprising at least one cobinder, at least one chelating agent, at least one alkali metal carbonate, and at least one carbonate material distinct from the at least one alkali metal carbonate,
   c) mixing the at least one premix P, the at least one activation system A, and at least one slag S successively and/or simultaneously and in any order until a fresh activated slag concrete is obtained, and
   d) leaving the fresh activated slag concrete to harden.

2. The method of claim 1, wherein the at least one premix P has a temperature of at least 15° C. in step a).

3. The method of claim 1, wherein the at least one activation system A of step b) comprises the at least one slag S.

4. The method of claim 1, additionally comprising mixing at least one adjuvant with the at least one premix P, the at least one activation system A, and the at least one slag S successively and/or simultaneously and in any order until the fresh activated slag concrete is obtained in step c).

5. The method of claim 1, wherein the total amount of the at least one cobinder is less than 5% by weight, relative to the total weight of the at least one activation system A and the at least one slag S.

6. The method of claim 1, wherein the at least one slag S comprises at least one ground granulated blast-furnace slag.

7. The method of claim 1, wherein the at least one cobinder comprises at least one precursor of calcium ions.

8. The method of claim 1, wherein the at least one activation system A comprises the at least one alkali metal carbonate chosen from sodium carbonates, potassium carbonates, or mixtures of two or more thereof.

9. The method of claim 1, wherein the at least one carbonate material distinct from the at least one alkali metal carbonate is provided in the form of at least one material chosen from limestone, dolomite, precipitated calcium carbonate, chalk, marble, aragonite, travertine, tufa, or mixtures of two or more.

10. The method of claim 1, wherein the at least one chelating agent comprises a chelating agent for a calcium ion or for an aluminum ion.

11. The method of claim 1, wherein the at least one chelating agent is chosen from phosphonates.

12. The method of claim 1, wherein the weight ratio of the total amount of the at least one alkali metal carbonate to the total amount of the at least one slag S ranges from 2% to 12%.

13. The method of claim 1, wherein the weight ratio of the total amount of the at least one cobinder to the total amount of the at least one slag S ranges from 1% to 5%.

14. The method of claim 1, wherein the weight ratio of the total amount of the at least one chelating agent to the total amount of the at least one slag S ranges from 0.001% to 2%.

15. The method of claim 1, further comprising
   i) mixing the at least one activation system A, the at least one slag S, and water simultaneously or in any order at a weight ratio of the total amount of the at least one activation system A and the at least one slag S to the total amount of the water ranging from 0.1 to 1, and
   ii) mixing the mixture of step i) with the at least one premix P.

16. The method of claim 4, wherein the at least one adjuvant is chosen from naphthalene-based superplasticizers, polynaphthalene sulfonates, lignosulfonates, or mixtures of two or more thereof.

17. The method of claim 1, wherein step c) is carried out in a concrete mixing plant.

18. An activated slag concrete manufactured by a method comprising:
   a) having at least one premix P comprising water and at least one aggregate, wherein the temperature of the at least one premix P is at least 10° C.,
   b) having at least one activation system A comprising at least one cobinder, at least one chelating agent, at least one alkali metal carbonate, and at least one carbonate material distinct from the at least one alkali metal carbonate,
   c) mixing the at least one premix P, the at least one activation system A, and at least one slag S successively and/or simultaneously and in any order until a fresh activated slag concrete is obtained, and
   d) leaving the fresh activated slag concrete to harden.

19. The activated slag concrete of claim 18, wherein the activated slag is characterized by a characteristic 28-day compressive strength on a cylindrical specimen of at least 30 MPa and on a cubic test specimen of at least 37 MPa, thus falling at least within a strength class that is C30/37 according to the standard NF EN 206/CN.

20. A fresh activated slag concrete, manufactured by a method comprising:
   a) having at least one premix P comprising water and at least one aggregate, wherein the temperature of the at least one premix P is at least 10° C.,
   b) having at least one activation system A comprising at least one cobinder, at least one chelating agent, at least one alkali metal carbonate, and at least one carbonate material distinct from the at least one alkali metal carbonate, and
   c) mixing the at least one premix P, the at least one activation system A, and at least one slag S successively and/or simultaneously and in any order until the fresh activated slag concrete is obtained.

21. The fresh activated slag concrete of claim 20, wherein the fresh activated slag concrete:
   exhibits an Abrams cone slump of greater than or equal to 160 mm according to the standard NF EN 12350-2, and
   falls at least within a consistency class that is S4 or S5 according to the standard NF EN 206/CN, for a period of time of at least 60 minutes.

\* \* \* \* \*